A. L. SHEARS.
Sled Knee.

No. 121,673.

Patented Dec. 5, 1871.

Witnesses:
Phil. T. Dodge,
Chas. C. Wilson

Inventor
A. L. Shears.
by Hodge & Munn
his Attys

UNITED STATES PATENT OFFICE.

ALBERT L. SHEARS, OF FLINT, MICHIGAN.

IMPROVEMENT IN SLED-KNEES.

Specification forming part of Letters Patent No. 121,673, dated December 5, 1871.

*To all whom it may concern:*

Be it known that I, ALBERT L. SHEARS, of Flint, in the county of Genesee and State of Michigan, have invented certain Improvements in Sled-Knees, of which the following is a specification, reference being had to the accompanying drawing.

My invention relates to metallic knees for sleighs; and the invention consists in welding together two wrought-iron rods and casting thereon a body of cast-iron in such a manner as to form a knee and brace, with the bolts for attaching the same to the runner and beam, all in a single piece, as hereinafter explained.

Figure 1:
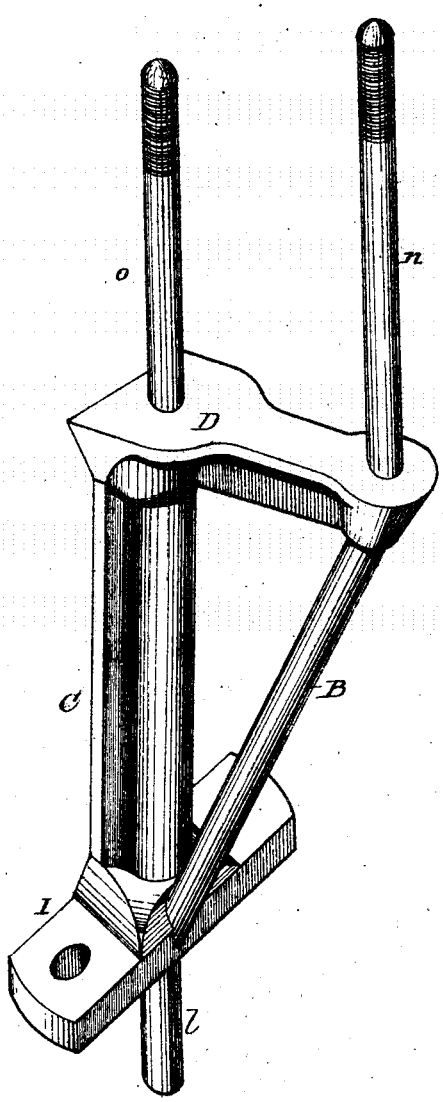
Figure 2:
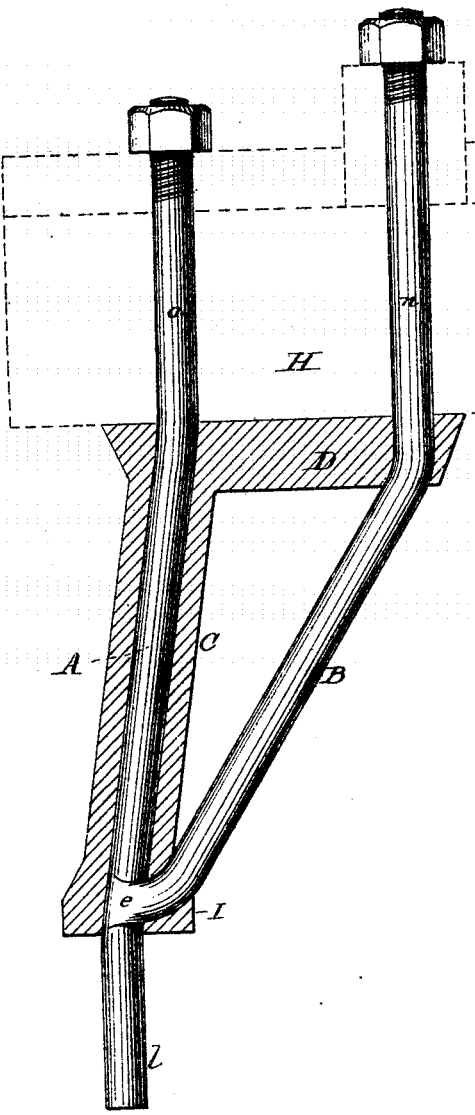

Figure 1 is a perspective view of my improved knee complete. Fig. 2 is a side elevation of the same with the cast-iron portion shown in section.

To make my improved knee I first take a round wrought-iron rod, of the proper length to extend from the bottom or near the bottom of the runner to the top of the beam, as represented by A, Fig. 2, the rod being slightly bent, as there shown, to give the proper form or inclination to the knee when completed. Another similar rod, B, is then taken and welded at its lower end to the rod A, as shown at e, Fig. 2, this rod B being inclined as shown from its point of union with the rod A to near the under side of the beam H, from whence it extends vertically upward far enough to reach this beam and the rave or bar R on the top thereof and receive a nut. These two rods A and B being thus bent and welded together are placed in a suitably-prepared mold and cast-iron is then poured into the mold in such a manner as to form a flange, I, at the bottom, as shown in Fig. 1, and to surround and embody the rod A as far up as the under side of the beam, the cast-iron extending horizontally across from the rod A at that point to and surrounding the brace or rod B, as shown in Figs. 1 and 2. It will thus be seen that the cast-iron forms a flange, I, at the bottom for bolting it to the runner, this flange I running lengthwise with the runner and having a hole in each end for that purpose; also a rigid body or upright part, C, and also a flange or bar, D, at the top for the beam H to rest upon, and at the same time firmly unites the parts A and B, forming a light but strong knee consisting of a single piece. The upper or projecting end o of the rod A, and also the upper portion n of the rod B, have screw-threads formed thereon to receive nuts to hold the knee in place, as represented in Fig. 2, the extension n being made longer than the extension o so as to reach through the rave R above the beam H, while the latter or extension o has only the beam to pass through. The extension l of the rod A below the flange I is made long enough to extend into the runner a suitable distance, and, if desired, it may also have a nut screwed onto it, the nut fitting into a recess in the under side of the runner, but this I do not consider necessary, as the extension l fitting snugly into a hole in the runner, together with the two bolts through the flange I and the runner, are sufficient to firmly unite and secure the parts together.

The knees thus formed may be made of any desired size to adapt them to light or heavy sleighs, as may be desired, and when thus made may be furnished to the manufacturers of sleighs generally as an article of trade ready for use. By this means, also, any person can at any time and with but a few moments delay, replace a broken knee in a sleigh.

I am aware that a patent was granted to J. M. Blake April 28, 1868, for a sled-knee having wrought-iron standard and brace, with a cast-iron plate at top and bottom, and therefore I do not claim such; but Having described my invention, what I claim is—

A metallic sled-knee, consisting of the wrought rods A and B welded together at the bottom, and having the cast-iron cast thereon in such a manner as to form the foot-plate I, the body C, and the top plate D, all in a single rigid piece, substantially as described.

ALBERT L. SHEARS.

Witnesses:
L. G. BICKFORD.
HA. CAMERON.